(12) United States Patent
Taher et al.

(10) Patent No.: US 8,385,400 B2
(45) Date of Patent: Feb. 26, 2013

(54) ADAPTIVE EQUALIZATION IN THE PRESENCE OF BURST ERRORS

(75) Inventors: Tanim Mohammed Abu Taher, Chicago, IL (US); Ayham Al-Banna, Orland Park, IL (US)

(73) Assignee: ARRIS Group, Inc., Suwanee, GA (US)

( * ) Notice: Subject to any disclaimer, the term of this patent is extended or adjusted under 35 U.S.C. 154(b) by 292 days.

(21) Appl. No.: 12/916,300

(22) Filed: Oct. 29, 2010

(65) Prior Publication Data

US 2012/0106616 A1 May 3, 2012

(51) Int. Cl.
*H03H 7/30* (2006.01)

(52) U.S. Cl. .......................................... 375/232

(58) Field of Classification Search ........... 375/232–236
See application file for complete search history.

(56) References Cited

U.S. PATENT DOCUMENTS

| 7,151,797 | B2 * | 12/2006 | Limberg | 375/232 |
| 7,760,826 | B2 * | 7/2010 | Chang | 375/346 |

* cited by examiner

*Primary Examiner* — Kevin Kim
(74) *Attorney, Agent, or Firm* — Troy A. Van Aacken; Robert J. Starr (57) ABSTRACT

Methods for providing adaptive equalization in the presence of a burst error are provided. If an equalization algorithm has converged and burst errors are present during a symbol interval, the equalizer coefficients remain unchanged during the symbol interval. If the burst error is no longer present during the next symbol interval, the equalizer coefficients are updated based on the previously converged coefficients.

23 Claims, 7 Drawing Sheets

ADAPTIVE EQUALIZATION IN THE PRESENCE OF BURST ERRORS

TECHNICAL FIELD

This disclosure relates to adaptive equalization.

BACKGROUND

In a communication system, information is transmitted through a physical channel from a source to a destination. For example, a DOCSIS system can be used to deliver high-definition digital entertainment and telecommunications such as video, voice, and high-speed Internet over a cable network between a headend and a cable modem located at a subscriber premise. The cable network can take the form of an all-coax, all-fiber, or hybrid fiber/coax (HFC) network. Unfortunately, physical channels are imperfect and, therefore, distort the transmitted signal causing transmission errors in the receiver.

An equalizer can be used to compensate for the distortion caused by a physical channel. However, the performance of existing equalizers degrades in the presence of burst errors.

DETAILED DESCRIPTION

Various implementations of this disclosure detect burst errors in a communication system and override equalization algorithms to maintain the equalizer coefficients at their current values until the burst error is no longer present.

Figure 1:
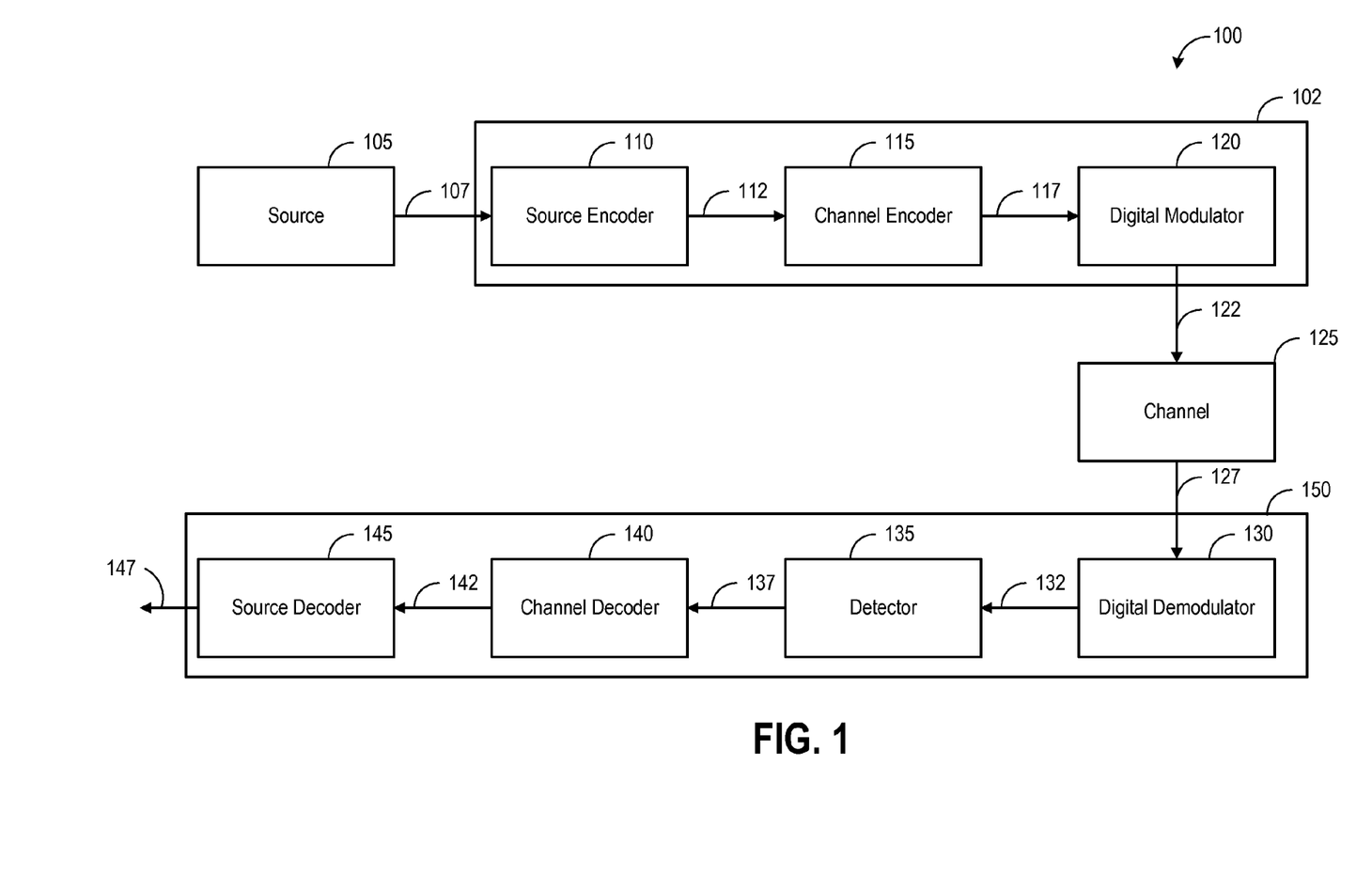
FIG. 1 illustrates an example digital communication system for transmitting information from a transmitter to a receiver.

FIG. 1 illustrates an example digital communication system 100 for transmitting information from a transmitter 102 to a receiver 150. In the system 100, a source 105 outputs a digital signal 107. The source encoder 110 then converts the digital signal 107 to a sequence of binary bits and compresses the sequence of binary bits to produce a compressed digital bit stream 112. Because transmission of a waveform representing a digital bit stream through a physical channel can cause the waveform to become corrupted, as discussed in more detail below, the channel encoder 115 introduces redundancy in the digital bit stream 112 to produce an encoded digital bit stream 117. The digital modulator 120 can convert blocks of k bits of the digital bit stream 117 into one of $2^k$ waveforms 122 that are compatible with the physical channel 125. A group of k bits forms a $2^k$ symbol set that maps to $2^k$ waveforms. At symbol time, the modulator 120 uses one of the $2^k$ different waveforms to represent a symbol (i.e., group of k bits) to be transmitted during a symbol interval.

The waveforms 122 are transmitted through the physical channel 125. As discussed above, transmission of the waveforms through the physical channel 125 can distort the waveforms 122 and produce distorted waveforms 127 at the receiver 150. The digital demodulator 130 in the receiver 150 filters and samples the distorted waveforms 127 to produce groups of k bits 132. A detector 135 attempts to determine the k-bit symbols that were transmitted. The detector 135 produces a bit stream 137.

The channel decoder 140 attempts to reconstruct the compressed bit stream 112 from the received bit stream 137 using its knowledge of the coding scheme of channel encoder 115 and the redundancy introduced by channel encoder 115. The reconstructed bit stream 142 produced by channel decoder 140 is passed to source decoder 140, which attempts to reconstruct the original digital signal 107. The distortion introduced by the digital system 100 can be measured by the difference between the original digital signal 107 and the reconstructed digital signal 147.

Many communication channels can be characterized as band-limited linear filters with a frequency response $$H_c(f)=|H_c(f)|e^{j\theta_c(f)} \quad (1)$$

where $|H_c(f)|$ is the channel's amplitude response and $\theta_c(f)$ is the channel's phase response. If $|H_c(f)|$ is not constant within a signal's bandwidth W, then amplitude distortion of the transmitted signal through the channel can occur. If $\theta_c(f)$ is not a linear function of frequency within a signal's bandwidth W, then phase distortion of the signal can occur. Such distortion results in intersymbol interference (ISI).

Figure 2:
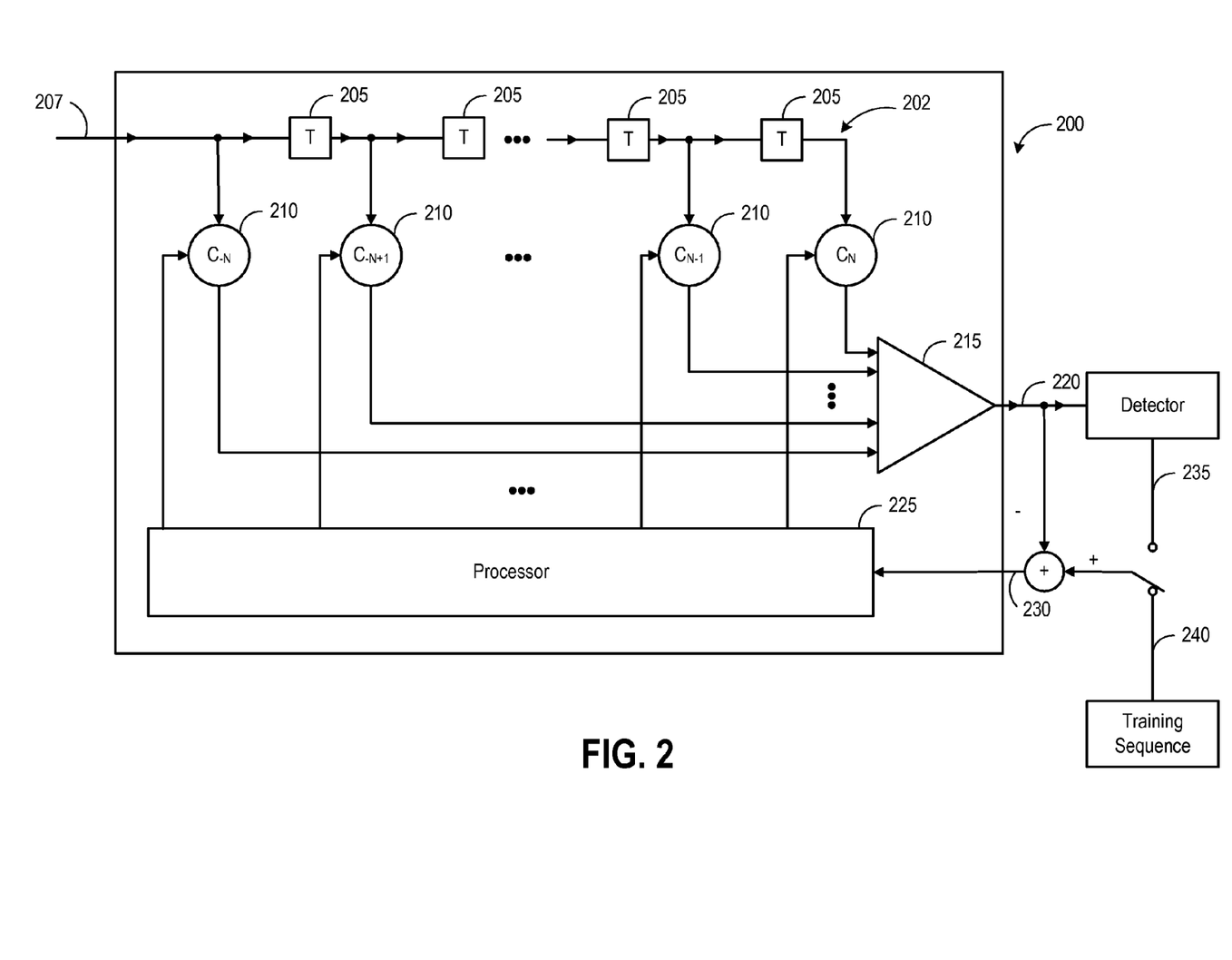
FIG. 2 illustrates an example equalizer or a portion thereof.

An equalizer can be used to compensate for linear channel distortion such as amplitude and phase distortion caused by a non-ideal physical channel frequency-response. An equalizer can be implemented in or after the demodulator 130. An equalizer or a portion thereof can be implemented as a transversal filter 200 as shown in FIG. 2. The example transversal filter 200 includes a delay line 202 having a time delay 205 of T-seconds per tap. In filter 200, current and past values of a received signal, $r_k$, 207 transmitted over a physical channel (for example the channel 125) can be linearly weighted with coefficients 210 using, for example, multipliers. The multipliers can multiply the values by the weighting coefficients 210 to obtain weighted values. The weighted values can then be summed by a summing or combining circuit 215 to produce an equalizer output, $z_k$, 220.

The weighting coefficients 210 can be set based on an optimization criterion. For example, the coefficients can be set to minimize the probability of error, the peak ISI distortion, or mean-square error.

Furthermore, in some implementations, the weighting coefficients 210 can be fixed. In other implementations, the weighting coefficients 210 can be adjusted. In various implementations, the adjustments to the weighting coefficients 210 can be made periodically or continuously. Adaptive equalization can include equalization processes where the coefficients of the equalizer are adjusted periodically or continuously. For example, in a cable network, the channel characteristics are not known and the distortions caused by the channel are not fixed but instead vary with time. Accordingly, for a cable network, for example, it may be desirable to adjust the coefficients of the equalizer at least periodically. The equalizer of FIG. 2 includes a processor 225 to update the coefficients 210.

Determining the optimum coefficients to satisfy an optimization criterion can be an iterative, recursive process. The coefficients 210 can be adjusted towards the optimum coefficients during each iteration of the optimization. For example, the coefficients 210 can be updated based on the following example equation:

$$c_n(k+1) = c_n(k) - \Delta e(k) r(k-n), n=-N,\ldots,N \quad (2)$$

where $c_n(k)$ is the nth coefficient at time k, $\Delta$ is a step size, e(k) is an error signal at time k, and r(k) is the received signal at time k.

As shown in equation (2), the coefficients 210 can be adjusted based on a step size, $\Delta$, and error, e(k), during each iteration. The step size, $\Delta$, can be fixed or variable, as discussed in more detailed below. As illustrated in FIG. 2, the error e(k) 230 can be the difference between the equalizer output 220 and either a predicted transmitted signal 235 (for example the predicted signal 137 produced by detector 135) or a training sequence 240.

The step size, $\Delta$, can be proportional to the magnitude of the error, e(k). Thus, during an initial transmission or training period when the equalizer is learning the state of the channel, the error, e(k), can be large because the equalizer can be initially ineffective at compensating for channel distortion. Thus, the step size can be set to a large value to permit the equalizer to converge to the optimum coefficients faster. To further aide in faster convergence during initial transmission, a known training sequence can be transmitted. In this case, the error, e(k), can be based on the difference between the equalizer output 220 and the known transmitted training sequence 240. For example, in a DOCSIS system, a cable modem can transmit to a headend a data burst having a known preamble followed by data. The known preamble is used by the headend receiver as a training sequence to determine the optimum coefficients.

After the initial transmission or training period and during a data transmission period, the error, e(k), can be based on the difference between the equalizer output 220 and the predicted transmitted signal 235.

During steady state when the equalizer has converged and is tracking the state of the channel, the error, e(k) can be small. Thus, the step size, $\Delta$, can be adjusted to a small value to maintain a low variance of the coefficients and assure system stability as the coefficients reach the optimum coefficients.

Figure 3A:
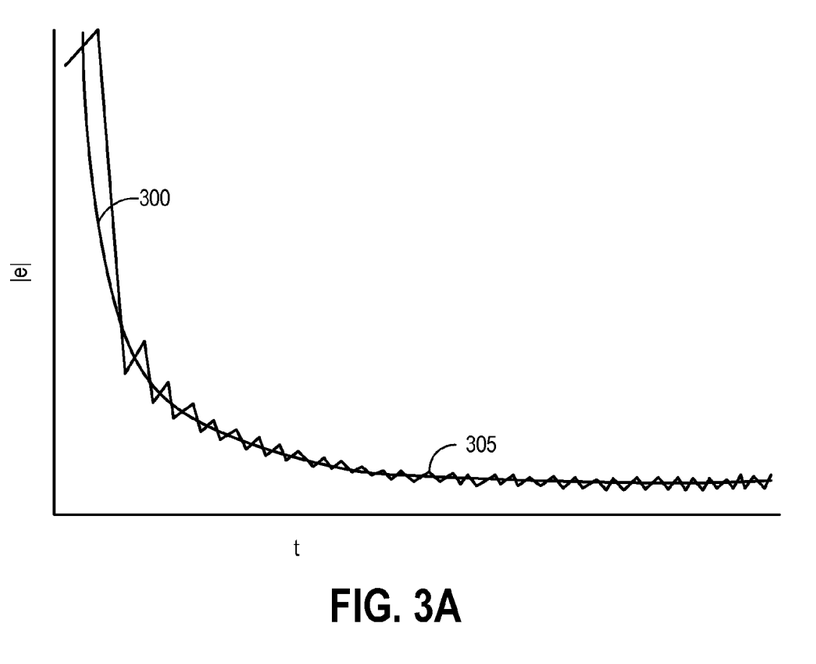
FIG. 3A illustrates an example graph of the magnitude of the average error signal in the example equalizer of FIG. 2.
Figure 3B:
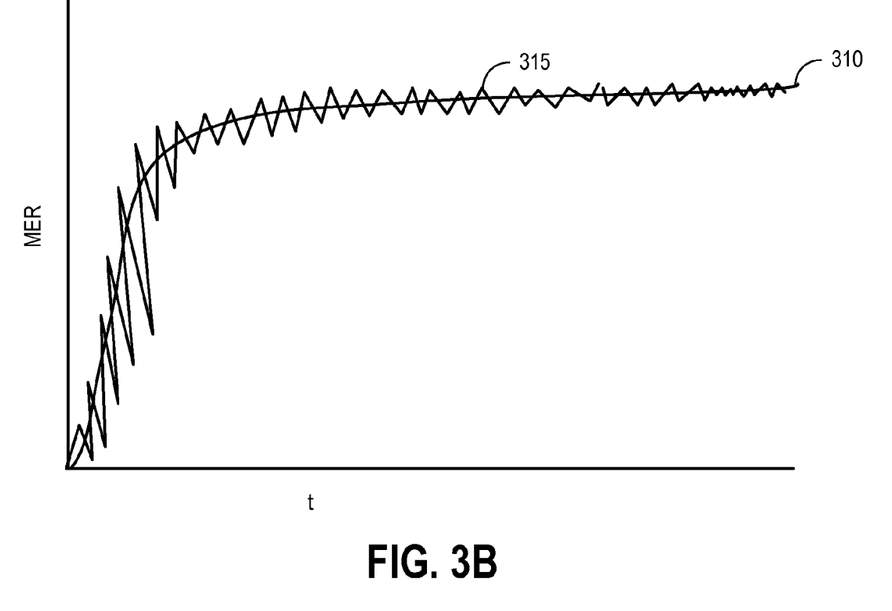
FIG. 3B illustrates an example graph of the average modulation error ratio and variance of the modulation error ratio for the example equalizer of FIG. 2.

FIG. 3A illustrates an example graph of the magnitude of the average error signal, |e|, 300. Initially, the magnitude of the average error signal, |e|, 300 can be large and the error variance 305 can be large, but, as the equalizer converges to the optimum coefficients, the magnitude of the average error signal, |e|, 300 and the error variance 305 can become smaller. Another measure of equalizer performance is a modulation error ratio (MER). The MER for an equalizer is inversely proportional to the power of the error signal. Thus, optimum equalizer coefficients can yield a maximum MER. As illustrated in FIG. 3B, during an initial transmission or training period, the average MER 310 can be small and the MER variance 315 can be large as the equalizer attempts to find the optimum coefficients. As the equalizer converges to the optimum coefficients, the average MER 310 increases and the MER variance decreases 315. FIGS. 3A and 3B are for illustrative purposes only and are not based on actually values.

Adjusting the step size based on an error signal as described above can work well in channels with linear channel distortion and Additive White Gaussian Noise (AWGN). However, in addition to linear distortion and AWGN in communication channels, other channel impairments exist in communication channels that result in burst errors. Burst errors can be caused by non-linear distortion such as impulse noise, burst noise, channel interruption, imperfect timing synchronization, and imperfect frequency synchronization. However, burst errors are not constantly present; instead, they are intermittent.

Figure 4A:
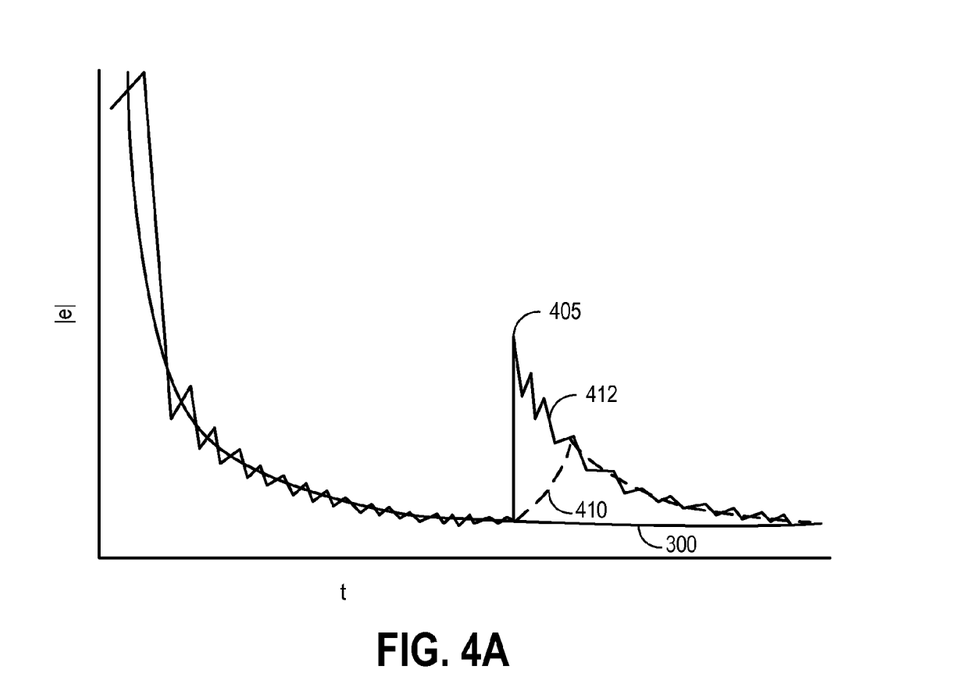
FIG. 4A illustrates an example graph of the magnitude of the average error signal in the presence of burst errors.
Figure 4B:
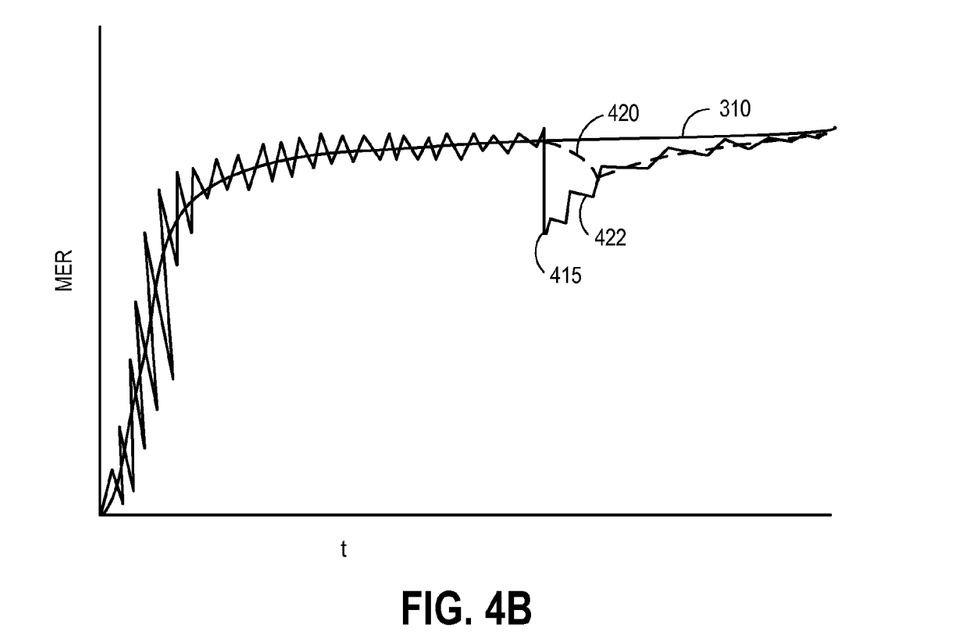
FIG. 4B illustrates an example graph of the magnitude of the average modulation error ratio in the presence of burst errors.

Because existing equalizers are designed based on linear channel distortion, these equalizers do not respond well to burst errors. Assume that an equalizer has converged to optimum or near optimum coefficient values and, therefore, the error, e(k), is small. As illustrated in FIG. 4A, if a burst error occurs after the equalizer has converged, the error, e(k), can suddenly becomes large and the MER can suddenly become small, as illustrated by the spikes 405 and 415, respectively. The large error, e(k), 405 can result in a larger step size, $\Delta$, as discussed above. During the next iteration, as discussed above, the equalizer coefficients are adjusted based on the larger step size, $\Delta$, and large error, e(k), 405. Thus, the adjusted equalizer coefficients can be far from the optimum or near optimum coefficients computed for the original channel prior to the burst error. If the burst error disappears during the next symbol interval, thereby restoring the channel to the original channel prior to the burst error, the equalizer coefficients computed based on the burst error can be far from the optimum or near optimum coefficients for the channel. Because the updated equalizer coefficients are far from the optimum or near optimum coefficients for the channel, the error, e(k), for subsequent symbol interval can be large, which subsequently can result in a larger magnitude of the average error signal, |e|, and smaller average MER 420 as shown by graphs 410, 420 in FIGS. 4A and 4B, respectively. As the equalizer re-converges to the optimum coefficients, the magnitude of the average error signal, |e|, 410 and the error variance 412 can become smaller, as shown in FIG. 4A. Similarly, as the equalizer re-converges to the optimum coefficients, the average MER 420 can increase and the variance 422 can decrease. Thus, as illustrated in FIGS. 4A and 4B, as a result of burst errors, the overall convergence time for the equalizer can be longer. FIGS. 4A and 4B are for illustrative purposes only and are not based on actually values.

It is noted that the above-described performance degradation in the equalizer caused by a burst error also occurs if the step size is fixed. This performance degradation occurs because the equalizer coefficients are adjusted based on the error, e(k), which will be large due to the burst error. Thus, the equalizer coefficient will diverge from the optimum coefficients even if the step size is fixed.

Figure 5:
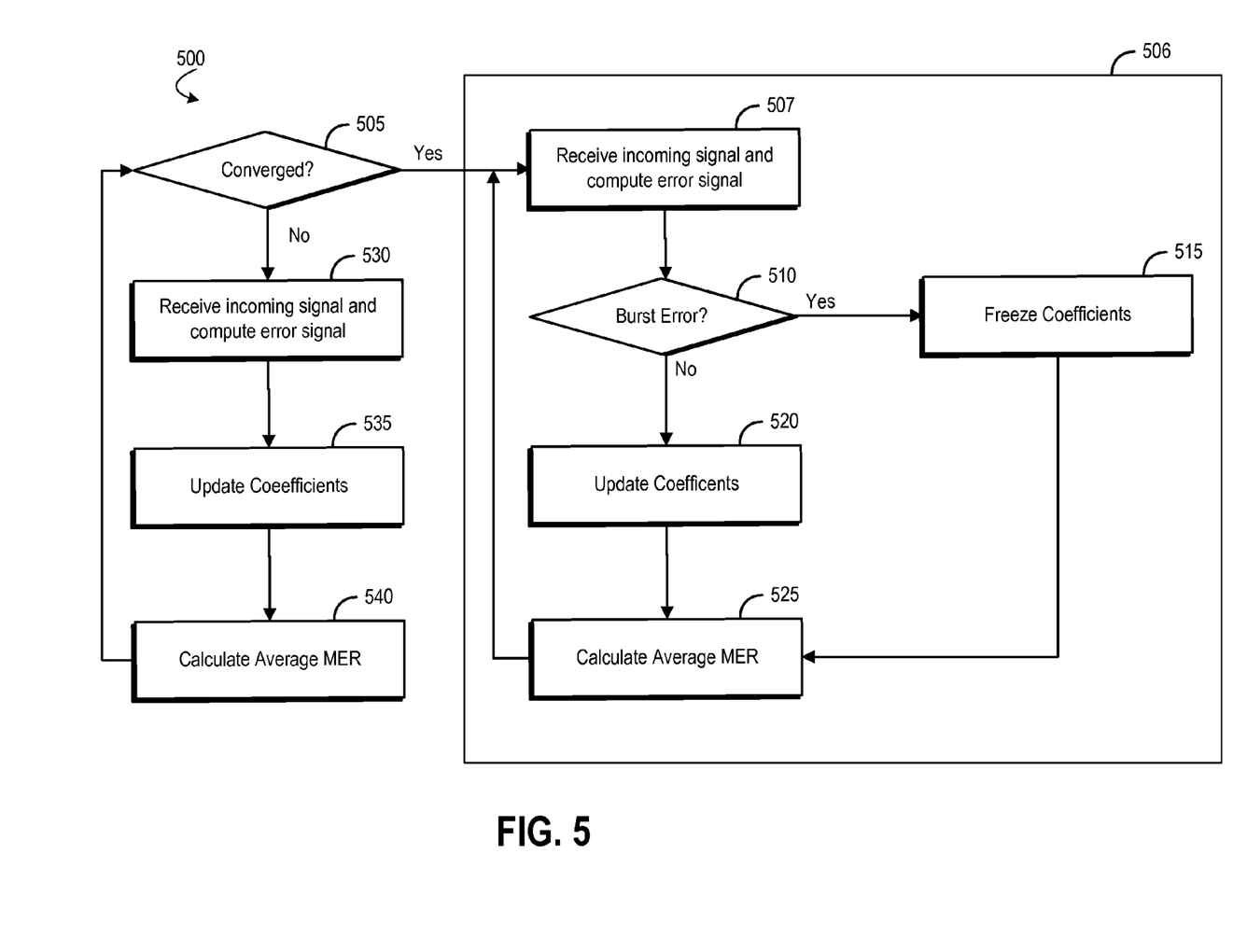
FIG. 5 illustrates an example process for providing adaptive equalization in the presence of intermittent and random burst errors.

FIG. 5 illustrates an example process 500 for providing adaptive equalization in the presence of intermittent and random burst errors. In some implementations, the process 500 can be performed by processor 225 of FIG. 2 programmed to perform the process 500 described herein. Although the following disclosure is described with respect to processor 225, in some implementations, process 500 can be performed by one or more programmable processors or can also be performed by, and apparatus can also be implemented as, special purpose logic circuitry, e.g., an ASIC (application specific integrated circuit). Process 500 can be implemented with any equalizer algorithm to determine and update equalizer coefficients.

At stage 505, during a current symbol interval, a determination is made whether the equalizer coefficients converged during the previous symbol interval. This determination can be made, for example, by a processor 225. In some implementations, the processor 225 can determine whether the equalizer coefficients converged based on the average MER or MER variance. For example, the processor 225 can determine that the equalizer coefficients have converged if the average MER exceeds a certain threshold or the MER variance is below a certain threshold. In some implementations, the processor 225 can determine whether the equalizer coefficients converged based on the magnitude of the average error signal.

If the equalizer coefficients did not converge during the previous symbol interval (i.e., "No" at stage 505), then at stage 530, an incoming signal for the current symbol interval is received and an error value (for example error, e(k), of FIG. 2) for the current symbol interval is computed. At stage 535, the equalizer coefficients are updated based on the equalizer algorithm (for example, based on equation 2). The equalizer values can be updated, for example, by the processor 225.

At stage 540, the average MER for the current symbol interval is calculated The average MER for the current symbol interval can be calculated by processor 225. The process 500 then returns to stage 505.

If the equalizer coefficients converged during the previous symbol interval (i.e., "Yes" at stage 505), then the equalizer enters a burst error detection mode 506. Then, at stage 507, an incoming signal for the current symbol interval is received and an error value for the current symbol interval is computed. Stage 507 can be performed by processor 225.

At stage 510, a determination is made whether a burst error occurred during the current symbol interval. The determination can be made, for example, by the processor 225. In some implementations, the processor 225 can determine whether a burst error occurred based on the MER for the current symbol. For example, if the MER for the current symbol is below the average MER by a certain amount, then the processor 225 can determine that a burst error occurred. As another example, if a change in MER (for example, the change from the MER in the previous symbol interval to the MER in the current symbol interval) exceeds a certain value, the processor 225 can determine that a burst error occurred. As another example, both the MER for the current symbol and the change in MER can be used to determine whether a burst error occurred.

If the determination is made that a burst error occurred (i.e., "Yes" at stage 510), then at stage 515, the equalizer coefficients are maintained at their current value (e.g., the processor 225 does not update the equalizer coefficients). The equalizer coefficients can be maintained at their current value, for example, by processor 225. In some implementations, the processor freezes the equalizer coefficients by overwriting the step size calculation of the equalizer algorithm and sets the step size equal to zero. For example, if the equalizer algorithm implements equation (2) to compute the updated coefficients, then to maintains the equalizer coefficients at their current value, processor 225 could set the step size, $\Delta$, equal to zero and thus $c_n(k+1)=c_n(k)$.

At stage 525, the average MER is calculated using the MER for the current symbol interval. The MER for the current symbol interval is calculated using the error value for the current symbol interval. The average MER can be calculated, for example, by processor 225. The process 500 then returns to stage 507, where the incoming signal for the next symbol interval is received and an error value for the next symbol interval is calculated.

If during the next symbol interval the burst error has disappeared and, therefore, the determination is made that a burst error did not occur during this next symbol interval, (e.g., "No" at stage 510), then at stage 520, the equalizer coefficients are updated based on the equalizer algorithm. The equalizer coefficients can be updated, for example, by the processor 225. For example, if equation (2) is used to compute the updated coefficients, then processor 225 uses the previously converged coefficient values to compute the updated coefficients since during the previous symbol interval the coefficients remained the same during the burst error. In this way, the updated coefficients do not diverge from the previously converged values due to an intermittent burst error. The process 500 proceeds to stage 525 where the average MER is calculated. The average MER can be calculated, for example, by the processor 225.

The process 500 returns to stage 507, where the incoming signal for the next symbol interval is received and an error value for the next symbol interval is calculated. This process 500 can be repeated until the end of a transmission, for example.

Figure 6:
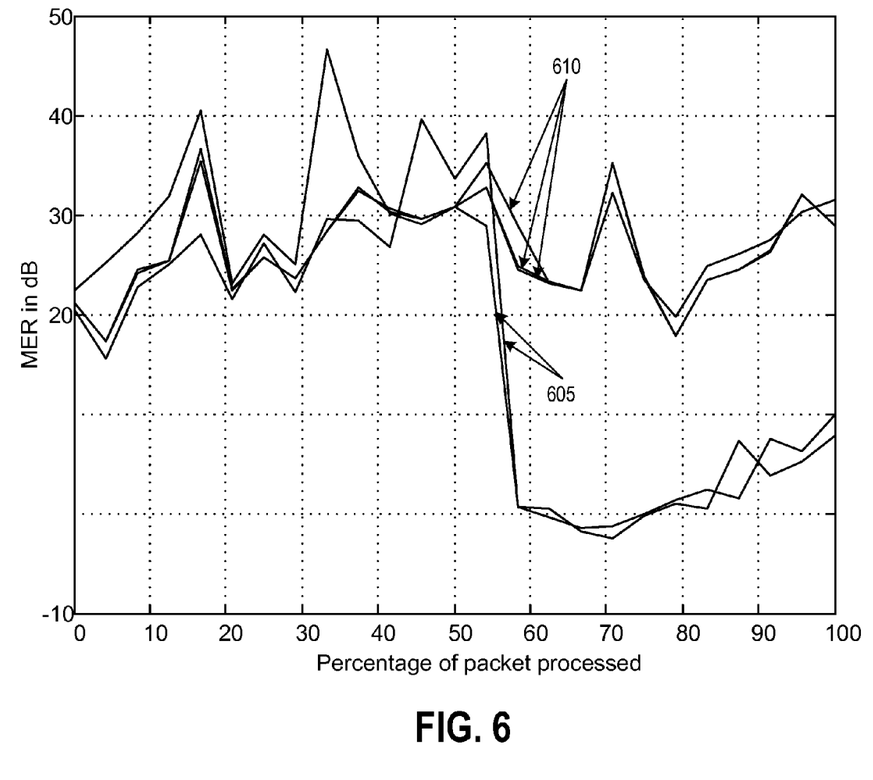
FIG. 6 illustrates the performance of the example process of FIG. 5 for several equalizer algorithms.

FIG. 6 illustrates the performance of process 500 for several equalizer algorithms. As shown in FIG. 6, existing equalizer algorithms can exhibit a decrease in the MER 605 of the equalizer in the presence of burst errors. Equalizer algorithms when modified according to process 500 may not exhibit a significant decrease in the MER in the presence of burst errors 610.

Figure 7:
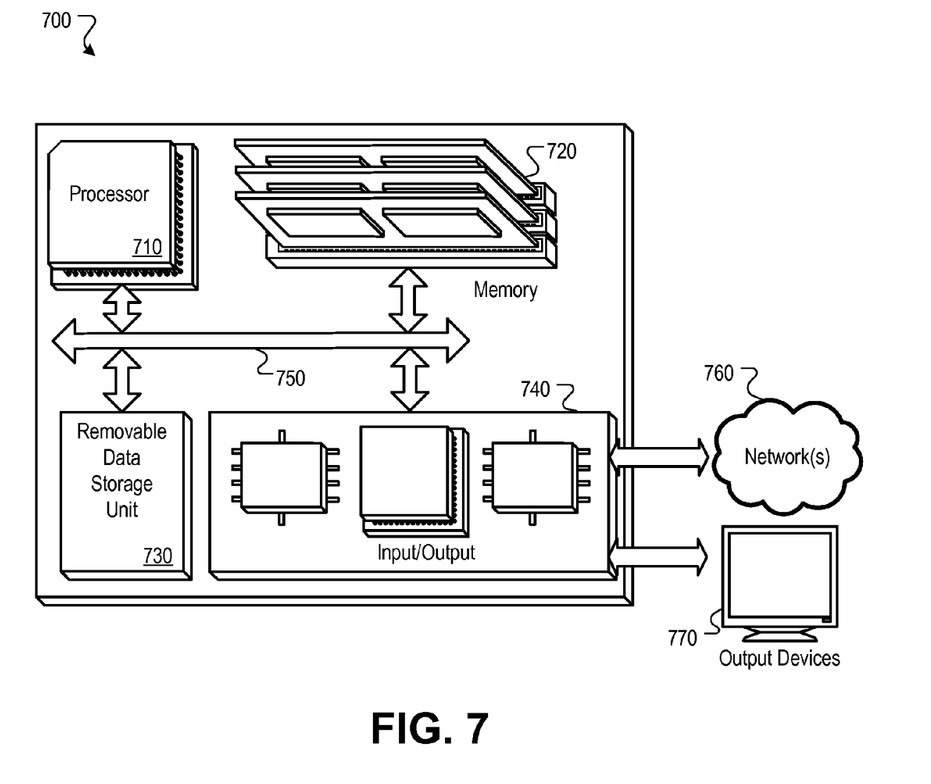
FIG. 7 is a block diagram of a broadband communications device operable to perform example process of FIG. 5.

FIG. 7 is a block diagram of a broadband communications device operable to perform process 500. The receiver device 700 can include a processor 710, a memory 720, a removable data storage unit 730, and an input/output device 740. Each of the components 710, 720, 730, and 740 can, for example, be interconnected using a system bus 750. The processor 710 is capable of processing instructions for execution within the receiver device 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the device 700. In one implementation, the memory 720 is a computer-readable medium. In one implementation, the memory 720 is a volatile memory unit. In another implementation, the memory 720 is a non-volatile memory unit.

In some implementations, the removable data storage unit 730 is capable of providing mass storage for the device 700. In one implementation, the storage device 730 is a computer-readable medium. In various different implementations, the storage device 730 can, for example, include a hard disk device, an optical disk device, flash memory or some other large capacity storage device.

The input/output device 740 provides input/output operations for the device 600. In one implementation, the input/output device 740 can include one or more of a wireless interface, network interface 760, such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., a monitor 770), as well as sending communications to, and receiving communications from various networks.

The device (e.g., a receiver device) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A method of adjusting equalizer coefficients of an equalizer during a current symbol interval based on an equalizer algorithm, the method comprising:
   determining whether equalizer coefficients of an equalizer converged during a previous symbol interval;
   determining whether a burst error occurred during a current symbol interval; and
   updating the equalizer coefficients based on the first determining step and the second determining step.

2. The method of claim 1 wherein determining whether equalizer coefficients converged during a previous symbol interval comprises determining whether equalizer coefficients converged during a previous symbol interval based on a modulation error ratio (MER).

3. The method of claim 2 wherein determining whether equalizer coefficients converged during a previous symbol interval comprises determining whether an average MER exceeds a first threshold value.

4. The method of claim 2 wherein determining whether equalizer coefficients converged during a previous symbol interval comprises determining whether the MER variance is below a second threshold value.

5. The method of claim 1 wherein determining whether equalizer coefficients converged during a previous symbol interval comprises determining whether equalizer coefficients converged during a previous symbol interval based on an equalizer output and a predicted transmitted signal.

6. The method of claim 1 wherein determining whether a burst error occurred during a current symbol interval comprises determining whether a burst error occurred during a current symbol interval based on a MER for the current symbol.

7. The method of claim 6 wherein determining whether a burst error occurred during a current symbol interval comprises determining whether the MER for the current symbol is below the average MER by a predetermined amount.

8. The method of claim 6 wherein determining whether a burst error occurred during a current symbol interval comprises determining whether a change in the MER exceeds a predetermined value.

9. The method of claim 1 wherein updating the equalizer coefficients based on the first determining step and second determining step comprises:
   updating the equalizer coefficients based on an equalizer algorithm if the equalizer coefficients did not converge during the previous symbol interval;
   maintaining the equalizer coefficients at their current value if the equalizer coefficients converged during the previous symbol interval and a burst error occurred during a current symbol interval.

10. The method of claim 9 wherein the equalizer algorithm is a variable step size algorithm.

11. The method of claim 9 wherein the equalizer algorithm is a fixed step size algorithm.

12. A computer readable medium having instructions for causing a computer to execute a method comprising:
   determining whether equalizer coefficients of an equalizer converged during a previous symbol interval;
   determining whether a burst error occurred during a current symbol interval; and
   updating the equalizer coefficients based on the first determining step and the second determining step.

13. The computer readable medium of claim 12 wherein determining whether equalizer coefficients converged during a previous symbol interval comprises determining whether equalizer coefficients converged during a previous symbol interval based on a modulation error ratio (MER).

14. The computer readable medium of claim 13 wherein determining whether equalizer coefficients converged during a previous symbol interval comprises determining whether an average MER exceeds a first threshold value.

15. The computer readable medium of claim 13 wherein determining whether equalizer coefficients converged during a previous symbol interval comprises determining whether the MER variance is below a second threshold value.

16. The computer readable medium of claim 12 wherein determining whether equalizer coefficients converged during a previous symbol interval comprises determining whether equalizer coefficients converged during a previous symbol interval based on an equalizer output and a predicted transmitted signal.

17. The computer readable medium of claim 12 wherein determining whether a burst error occurred during a current symbol interval comprises determining whether a burst error occurred during a current symbol interval based on a MER for the current symbol.

18. The computer readable medium of claim 17 wherein determining whether a burst error occurred during a current symbol interval comprises determining whether the MER for the current symbol is below the average MER by a predetermined amount.

19. The computer readable medium of claim 17 wherein determining whether a burst error occurred during a current symbol interval comprises determining whether a change in the MER exceeds a predetermined value.

20. The computer readable medium of claim 12 wherein updating the equalizer coefficients based on the first determining step and second determining step comprises:
  updating the equalizer coefficients based on an equalizer algorithm if the equalizer coefficients did not converge during the previous symbol interval;
  maintaining the equalizer coefficients at their current value if the equalizer coefficients converged during the previous symbol interval and a burst error occurred during a current symbol interval.

21. The computer readable medium of claim 20 wherein the equalizer algorithm is a variable step size algorithm.

22. The computer readable medium of claim 20 wherein the equalizer algorithm is a fixed step size algorithm.

23. An apparatus for adjusting equalizer coefficients of an equalizer during a current symbol interval based on an equalizer algorithm, the apparatus comprising:
  means for determining whether equalizer coefficients of an equalizer converged during a previous symbol interval;
  mean for determining whether a burst error occurred during a current symbol interval; and
  mean for updating the equalizer coefficients based on the first determining step and the second determining step.

* * * * *